(12) United States Patent
Balaram et al.

(10) Patent No.: US 12,319,227 B2
(45) Date of Patent: Jun. 3, 2025

(54) SEATBELT DEVICE

(71) Applicant: AUTOLIV DEVELOPMENT AB, Vargarda (SE)

(72) Inventors: Ashwin Balaram, Karnataka (IN); Abhijit Swain, Karnataka (IN); Abhijeet Atwadkar, Karnataka (IN); Iulian Rotariu, Kölln-Reisiek (DE); Timo Nehrenheim, Hamburg (DE); Ole Scharnberg, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 18/256,860

(22) PCT Filed: Dec. 6, 2021

(86) PCT No.: PCT/EP2021/084361
§ 371 (c)(1),
(2) Date: Jun. 23, 2023

(87) PCT Pub. No.: WO2022/128564
PCT Pub. Date: Jun. 23, 2022

(65) Prior Publication Data
US 2024/0025372 A1    Jan. 25, 2024

(30) Foreign Application Priority Data
Dec. 15, 2020 (DE) .................. 10 2020 133 574.1

(51) Int. Cl.
*B60R 22/48* (2006.01)
*B60R 16/027* (2006.01)

(52) U.S. Cl.
CPC ............ *B60R 22/48* (2013.01); *B60R 16/027* (2013.01); *B60R 2022/4816* (2013.01)

(58) Field of Classification Search
CPC .................. B60R 16/027; B60R 22/18; B60R 2022/1806; B60R 22/48;
(Continued)

(56) References Cited

U.S. PATENT DOCUMENTS 4,608,469 A * 8/1986 Doty ...................... B60R 22/48
200/275
6,082,481 A * 7/2000 Engler .................... B60R 22/48
280/801.1
(Continued)

FOREIGN PATENT DOCUMENTS

CN    106184112 A * 12/2016
CN    108216112 A *  6/2018 ....... B60R 21/01544
(Continued)

*Primary Examiner* — Drew J Brown
(74) *Attorney, Agent, or Firm* — DICKINSON WRIGHT PLLC

(57) ABSTRACT

The invention relates to a seatbelt device (1) for motor vehicles comprising a belt buckle (2) with an insertion slot (3), a belt tongue (4) which can be plugged into the insertion slot (3) of the belt buckle (2), can be locked therein, and has a belt tongue main body (5) and a belt tongue trim panel (6), and a seatbelt (7), wherein the seatbelt (7) runs through a hoop (8) of the belt tongue (4). The belt buckle (2) and the belt tongue (4) are configured to transmit electrical power and/or signals from the belt buckle (2) to the belt tongue (4).

16 Claims, 5 Drawing Sheets

(58) Field of Classification Search
CPC .... B60R 2022/4808; B60R 2022/4816; B60R 16/023; A44B 11/2546; A44B 11/2569
See application file for complete search history.

(56) References Cited

U.S. PATENT DOCUMENTS

| | | | | |
|---|---|---|---|---|
| 6,138,332 | A * | 10/2000 | Mori | B60R 22/48 24/633 |
| 6,572,148 | B2 * | 6/2003 | Wittenberg | G01L 5/108 280/808 |
| 7,765,652 | B2 * | 8/2010 | Nakamuru | B60R 22/48 24/641 |
| 8,010,255 | B2 * | 8/2011 | Darraba | B60R 21/01546 701/4 |
| 9,527,477 | B1 * | 12/2016 | Cech | A44B 11/2565 |
| 10,143,043 | B1 * | 11/2018 | Elson | B60R 22/48 |
| 10,249,450 | B2 * | 4/2019 | Jörimann | H01H 27/002 |
| 10,654,444 | B2 * | 5/2020 | Kataoka | A44B 11/2523 |
| 11,667,262 | B2 * | 6/2023 | Ots | B60R 22/48 340/457.1 |
| 2004/0140890 | A1 * | 7/2004 | Hartmann | B60R 22/48 340/505 |
| 2004/0182534 | A1 * | 9/2004 | Smith | F28F 5/02 162/272 |
| 2008/0163468 | A1 * | 7/2008 | Nakamura | B60R 22/48 24/641 |
| 2010/0265056 | A1 * | 10/2010 | Lai | B60R 22/48 340/457.1 |
| 2012/0137478 | A1 * | 6/2012 | Nimura | B60R 22/48 24/593.1 |
| 2013/0257608 | A1 * | 10/2013 | Larice | B60Q 9/00 340/438 |
| 2015/0145666 | A1 * | 5/2015 | Sugawara | B60R 22/48 340/457.1 |
| 2015/0265200 | A1 * | 9/2015 | Mahdi | A61B 7/02 600/528 |
| 2016/0355157 | A1 * | 12/2016 | Cech | A44B 11/2561 |
| 2020/0254966 | A1 * | 8/2020 | Ots | B60R 22/48 |
| 2020/0343766 | A1 * | 10/2020 | Tanaka | B60R 16/023 |
| 2021/0316698 | A1 * | 10/2021 | Cristea | B29C 45/14467 |
| 2023/0022040 | A1 * | 1/2023 | Johansson | A44B 17/0017 |
| 2023/0065653 | A1 * | 3/2023 | Moore | B60R 22/26 |
| 2023/0242069 | A1 * | 8/2023 | Bok | G08C 17/02 340/457.1 |

FOREIGN PATENT DOCUMENTS

| | | | | |
|---|---|---|---|---|
| CN | 109398301 | A * | 3/2019 | B60R 22/48 |
| CN | 109591758 | A * | 4/2019 | |
| DE | 102005002865 | B3 | 6/2006 | |
| DE | 102015204815 | A1 | 9/2016 | |
| DE | 102016113120 | A1 * | 2/2017 | B60Q 3/0293 |
| DE | 202018106947 | U1 | 12/2018 | |
| DE | 102019103460 | A1 | 8/2020 | |
| DE | 102019113893 | A1 | 11/2020 | |
| DE | 112015001282 | B4 * | 10/2021 | A61B 5/0205 |
| DE | 102022104479 | A1 * | 9/2022 | |
| DE | 102022112192 | A1 * | 11/2023 | A61B 5/0205 |
| EP | 2189372 | A1 * | 5/2010 | B60R 22/48 |
| EP | 2399477 | A1 * | 12/2011 | B60R 22/48 |
| EP | 3617009 | A1 * | 3/2020 | B60R 22/48 |
| KR | 20180063875 | A * | 6/2018 | |
| KR | 20100117926 | A * | 11/2020 | |
| WO | WO-2011053011 | A2 * | 5/2011 | B60R 22/48 |
| WO | WO-2011053015 | A2 * | 5/2011 | A44B 11/2569 |
| WO | WO-2015140273 | A2 * | 9/2015 | A61B 5/0205 |
| WO | 2020144249 | A1 | 7/2020 | |
| WO | WO-2022187298 | A1 * | 9/2022 | |
| WO | WO-2023028475 | A1 * | 3/2023 | B60R 22/1952 |

* cited by examiner

SEATBELT DEVICE

CROSS-REFERENCE TO RELATED APPLICATIONS

This application is a 35 U.S.C. § 371 national phase of PCT International Application No. PCT/EP2021/084361, filed Dec. 6, 2021, which claims the benefit of priority under 35 U.S.C. § 119 to German Patent Application No. 10 2020 133 574.1, filed Dec. 15, 2020, the contents of which are incorporated herein by reference in its entirety.

FIELD

The present invention relates to a seatbelt device having the features of the preamble of claim 1.

BACKGROUND

In seatbelt devices, different electrical or electronic components, such as, for example, microphones can be provided in the safety belt for additional functions. These components must be supplied with electrical power for permanent operation. The connection of a microphone in the seatbelt is known, for example, from DE 10 2005 002 865 B3.

In the case of three-point straps, one end of the seatbelt is generally fastened to a vehicle or to the vehicle seat on a fastening element, usually referred to as an anchor plate, where the coupling of the necessary electrical conductors can take place in a simple manner.

Furthermore, a seatbelt device with an electronic device is known from DE 10 2019 103 460 A1, in which energy is inductively transferred to a corresponding receiving unit in the webbing via a transmitter unit arranged outside the belt strap. In this case, a plurality of offset coils as transmitting and/or receiving unit can be used to compensate for the position of the webbing during use.

SUMMARY

Against this background, the object of the invention is to specify a seatbelt device which enables improved transmission of electrical power and/or signals to a movable part of a seatbelt device.

According to the invention, a seatbelt device having the features of claim 1 is proposed for achieving the object. Further preferred developments can be taken from the dependent claims, the figures and the associated description.

According to the basic idea of the invention, a seatbelt device for motor vehicles is proposed which comprises a belt buckle with an insertion slot, a belt tongue insertable into the insertion slot of the belt buckle and lockable therein, said belt tongue having a belt tongue main body and a belt tongue cover, and a seat belt. The seatbelt extends through a hoop of the belt tongue. According to the invention, it is proposed that the belt buckle and the belt tongue are designed to transmit electrical power and/or signals from the belt buckle to the belt tongue.

A transmission of electrical power and/or signals from the belt buckle to the belt tongue enables a corresponding transmission independently of fixed stop points of a seatbelt which in the prior art enables a simple transmission to a movable part of the seatbelt device, in this case the seatbelt. As a result of the proposed transmission to the belt tongue, so-called double retractors can be used for the seatbelt device in a simple manner, each having separate retractors in the case of a three-point belt for the chest and lap belt. Accordingly, in such a seatbelt device, no fixed stop point of the seatbelt is available for transmission.

The transmission of electrical power and/or signals in this case exceeds a mere closing of an electrical contact by the belt tongue, which can be used, for example, to be able to detect the inserted state. Nevertheless, the transmission of electrical power and/or signals to the belt tongue can be used to control an inserted state. Accordingly, no additional microswitch is necessary in the belt buckle for the detection of the inserted state. In advantageous embodiments, the belt tongue can have one, two or more status indicators, for example two status LEDs, which can indicate, for example, an inserted state and/or the state of a wireless data connection, for example by means of Bluetooth.

The movable part of a seatbelt device comprises a seatbelt and a belt tongue.

According to a further development, it is proposed that the belt buckle and the belt tongue each have an inductor coil for transmitting electrical power and/or signals.

The two inductor coils enable a contactless transmission of electrical power from the belt buckle to the belt tongue, whereby the transmission can take place without contact and independently of any contamination. The transmittable power can be 2.5 W, for example. Furthermore, the two inductor coils can alternatively or additionally also be used for transmitting electrical signals from the belt buckle to the belt tongue and/or from the belt tongue to the belt buckle.

It is further proposed that the inductor coil of the belt buckle is arranged in the region of the insertion slot for inserting the belt tongue.

The region of the insertion slot is particularly suitable for the arrangement of an inductor coil in order to achieve the smallest possible distance from a belt tongue. The arrangement of the inductor coil in the region of the insertion slot can, for example, be arranged upstream of the insertion slot, in the insertion slot itself or in an intermediate position, so that the inductor coil is arranged in the insertion slot only partially.

According to a further development, it is proposed that the inductor coil of the belt buckle is arranged in relation to the insertion slot on the opposite side of an unlocking button of the belt buckle.

An opposite arrangement on the side facing away from the unlocking button enables a simplified construction and permits the smallest possible distance between the inductor coil and the inductor coil of the belt tongue in order to achieve a high transmission efficiency. Furthermore, the inductor coil is concealed by the belt tongue in a conventional installation situation, which offers optical advantages.

According to a further proposed embodiment, the inductor coil of the belt tongue is arranged above a locking section of the belt tongue main body in relation to the insertion direction.

Accordingly, the inductor coil of the belt tongue does not have to be inserted into the belt buckle over a wide distance, and accordingly the insertion slot and the locking mechanism which engages in the locking portion of the belt tongue main body can be designed independently of the inductor coil.

According to a further development, it is proposed that the inductor coil of the belt tongue is arranged on a main surface of the belt tongue main body, wherein the inductor coil is covered by the belt tongue cover.

The belt tongue main body is produced, for example, from a metal sheet and therefore has two main surfaces, for example front and rear sides. The main surfaces form the majority of the surface of the belt tongue main body. The inductor coil can be placed on one of the two main surfaces in the corresponding arrangement. In particular, that main surface is suitable which faces away from the unlocking button when the belt tongue is inserted. A flat inductor coil can therefore be placed on the belt tongue main body in a simple manner, wherein the belt tongue cover, which is preferably made of a plastic, covers the inductor coil for mechanical protection. The belt tongue cover can also extend between the inductor coil and the belt tongue main body.

It is further proposed that the belt tongue in the inserted and locked state has a freedom of movement along an insertion axis. The freedom of movement is limited, on the one hand, by a locking position of the belt tongue, in which no further extension of the belt tongue is possible without actuation of an unlocking probe, and on the other hand by a pushing-in position of the belt tongue, in which no deeper insertion of the belt tongue into the insertion slot is possible. The inductor coil of the belt tongue and the inductor coil of the belt buckle are arranged concentrically to one another in a certain relative position in the movement clearance.

This results in optimal coverage of the inductor coils of the belt tongue and the belt buckle within the movement clearance of the belt tongue in the inserted and locked state, in which the power and/or data transmission is optimal.

The pushing-in position of the belt tongue, in which no deeper insertion of the belt tongue into the insertion slot is possible, is also referred to as overtravel position. The locking position of the belt tongue, in which no further extension of the belt tongue is possible without actuation of an unlocking probe, can also be referred to as normal position.

It is further proposed that the relative position in which the inductor coil of the belt tongue and the inductor coil of the belt buckle are arranged concentrically to one another is arranged in a central region of the movement clearance.

The central region is a partial section of the movement clearance which extends along an insertion axis of the belt buckle. The central region can, for example, each have a distance from the limits of the range of movement of, for example, 20%, further for example 25% of the entire movement clearance along the insertion axis.

According to a further development, it is proposed that the belt tongue and the belt buckle each have a plurality of electrical contacts which, when the belt tongue is inserted and locked, produce a plurality of electrical connections for transmitting electrical power and/or signals between the belt buckle and the belt tongue.

Accordingly, electrical power and/or signals can be transmitted from the belt buckle to the belt tongue and/or from the belt tongue to the belt buckle via the electrical contacts on the belt tongue and the belt buckle.

It is further proposed that the contacts of the belt buckle are arranged in relation to the insertion slot on the other side of an unlocking button of the belt buckle.

As a result, the unlocking button and the associated unlocking mechanism can be arranged and designed separately from the contacts of the belt buckle. In addition, the unlocking probe can thereby be designed up to the insertion slot in a particularly easy manner. In addition, there are no contacts in the access region of an operator when the unlocking button is actuated, so that contamination can be avoided.

According to a further development, it is proposed that the contacts of the belt tongue are arranged above a locking section of the belt tongue main body in relation to the insertion direction.

In this way, a geometric separation of the contacts on the belt tongue from the locking mechanism in the insertion slot of the belt buckle can be achieved.

It is also proposed that at least two electrical connections are provided for transmitting electrical power and/or signals from the belt tongue to the seatbelt.

By means of two or more electrical connections between the belt tongue and the seatbelt, electrical power and/or signals from a belt buckle can be transmitted to the seatbelt via the belt tongue. In this way, electronic components can be operated and/or controlled in or on the seatbelt.

Furthermore, in advantageous embodiments, exclusively electrical power can be transmitted from the belt buckle via the belt tongue to the seatbelt or the electrical and/or electronic components provided therein or thereto. The transmission of signals between electrical and/or electronic components in the seatbelt and further systems in a vehicle can take place, for example, via radio standards such as Bluetooth.

In an advantageous embodiment, a plug connection is provided on the hoop of the belt tongue, wherein the plug connection is arranged on the hoop on the side facing away from the insertion direction.

The plug connection is thus arranged on the side of the hoop which points in the pull-out direction of the belt tongue. Although this is also the direction in which any belt forces act, this side or surface of the hoop is unstressed. Therefore, the plug-in connection on the belt tongue is located in a region which is not provided for the transmission of forces between the belt tongue and the seatbelt.

According to a further development, it is proposed that the hoop of the belt tongue is folded over by a sewn loop of the seatbelt, wherein a plug connection is provided on the seatbelt, which plug connection is arranged within the sewn loop of the seatbelt.

The sewn loop of the seatbelt surrounds the hoop, so that two ends of the seatbelt, which can apply tensile forces to the hoop of the belt tongue independently of one another, are removed from the belt tongue. At least two belt layers are sewn together for this. Such a sewn loop is particularly suitable for the use of two retractors for the chest and pelvis strap respectively. An arrangement of the plug connection in the loop enables protection of the plug connection through the seatbelt, so that a user cannot get caught on the plug connection or can manipulate it in a simple manner.

It is further proposed that the plug connection of the seatbelt is arranged on a cable which exits from the safety belt within the sewn loop.

The cable at the plug-in connection achieves a flexibility of the connection which is sufficient to compensate for the mobility of the sewn loop around the hoop of the belt tongue, so that a connection of the plug connections of the belt tongue and the belt buckle can be kept free from mechanical stresses.

According to a further development, it is proposed that the cable extends through a sewn section of the sewn loop of the seatbelt.

The cable can be guided between two sewn belt layers of the seatbelt and held in the sewn section. Alternatively, the cable can run within a tubular belt position of the seatbelt through the sewn section and exit into the sewn loop within the loop from the tubular belt position. Accordingly, the cable is fixed in its position by the sewn portion.

In an advantageous embodiment, the cable has two lines, at least in the sewn section, which have a width greater than 2 mm, preferably greater than 4 mm, further preferably of 6 mm.

A correspondingly wide cable can be designed very flat and at the same time provide a sufficient line cross section. As a result, the visibility of the cable in the sewn section is also significantly reduced. In addition, such a cable offers a very high tolerance to a puncturing, as can arise during the production of the sewn section by a sewing needle. Any puncture only minimally reduces the line cross section at the corresponding width, so that a high error tolerance can be achieved during production.

According to a further development, it is proposed that a flexible printed circuit is provided in or on the seatbelt to which electrical power and/or signals are transmitted from the belt buckle via the belt tongue and via the seatbelt.

Various electronic components for various functions such as, for example, belt microphone, triggering of a belt airbag, occupant classification, lighting, vibration elements can be provided on the flexible circuit board. The cable can be connected in the sewn section, for example, to a flexible circuit board or alternatively be integral with the flexible circuit board.

BRIEF DESCRIPTION OF THE DRAWINGS

The invention is explained below using preferred embodiments with reference to the accompanying figures. The following are shown.

DETAILED DESCRIPTION

Figure 1:
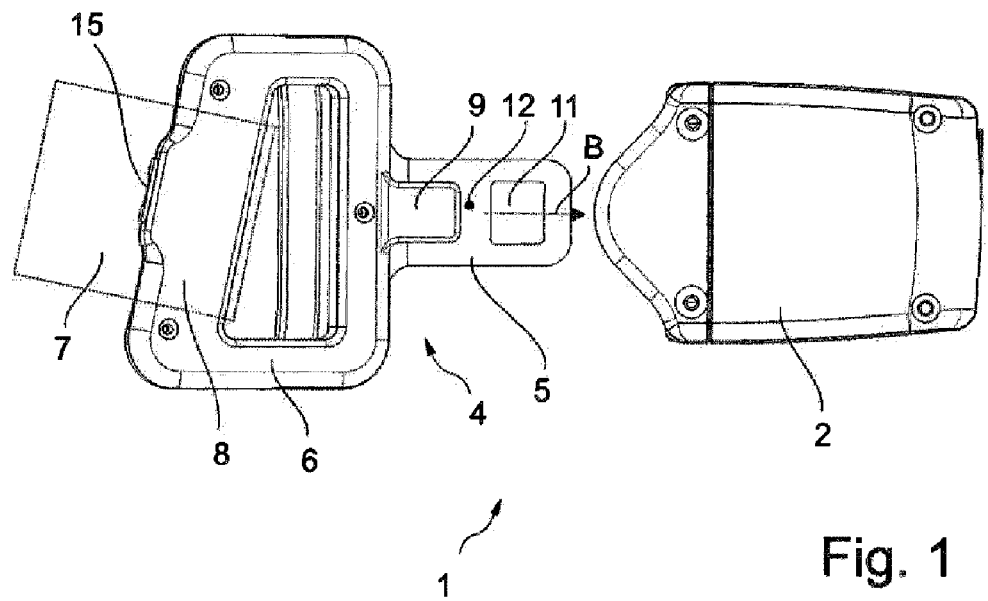
FIG. 1 shows a rear view of a belt tongue and a belt buckle with inductor coils.

FIG. 1 shows an embodiment of a seatbelt device 1 which is designed to inductively transmit an electrical power and/or signals from the belt buckle 2 to the belt tongue 4.

The belt tongue 4 has a belt tongue main body 5, which can be made, for example, of sheet metal. The belt tongue main body 5 is partially enveloped by a belt tongue cover 6. The section of the belt tongue 4, which is provided for insertion into the insertion slot 3 of a belt buckle 2, has a recess which forms a locking section 11 of the belt tongue 4. A locking mechanism of the belt buckle 2 engages in the locking portion after insertion of the belt tongue 4 into the insertion slot 3. In alternative embodiments, the locking portion 11 can be formed on the outer contour of the belt tongue 4 and have no recess. The locking can be released by an operator by pressing the unlocking button 10.

An inductor coil 9 is provided on the belt tongue 4 on the rear side or the side which is provided for the alignment towards a passenger. In this advantageous embodiment, the inductor coil 9 lies parallel to a main surface 12 of the belt tongue main body 5, i.e. the main axis of the inductor coil 9 is perpendicular to the main surface 12. The inductor coil 9 is located above the locking section 11 in relation to an insertion direction B. Therefore, above the locking section 11 means that the locking section 11 must be inserted into the insertion slot 3 in front of the inductor coil 9 in each case. In one possible embodiment, the inductor coil 9 can be inserted into the insertion slot 3. Alternatively, only the inductor coil 9 can also be partially inserted, i.e. provided in a transition region of the insertion slot 3 in the inserted state of the belt tongue 4. The inductor coil 9 is preferably covered by the belt tongue cover 6, so that the inductor coil 9 is mechanically protected against external influences. The belt tongue cover 6 is made of plastic, whereby the belt tongue cover 6 does not represent an obstacle for inductive power and/or signal transmission.

The belt tongue 4 also has a hoop 8, through which the seatbelt 7 is guided, so that forces can be introduced from the seatbelt 7 into the hoop 8. In advantageous exemplary embodiments, the hoop 8 is encased by the belt tongue cover 6, in particular on the side in the insertion direction B, so that, for example, the edges of the metallic belt tongue main body 5 can be rounded by the belt tongue cover 6, which, among other things, minimizes the wear on the seatbelt 7.

Figure 2:
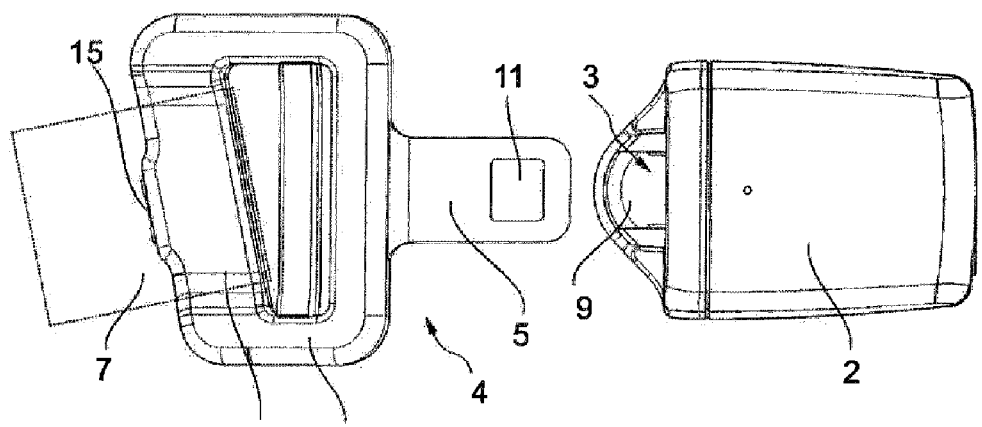
FIG. 2 shows a front view of a belt tongue and a belt buckle with inductor coils.

FIG. 2 shows the exemplary embodiment of FIG. 1 in a front view, which is provided to point away from the belted-in body of a passenger, i.e. a passenger primarily sees this side when belted in. In this view, the inductor coil 9 of the belt tongue 4 is concealed by the belt tongue 4 itself.

In contrast to the view In FIG. 1, the position of the inductor coil 9 on the belt buckle 2 can be seen In the front view. The inductor coil 9 is located on the belt buckle 2 in the region of the insertion slot 3 and is concealed by the housing 21 of the belt buckle 2. The insertion slot 3 is arranged between the inductor coil 9 on the one side and the unlocking button 10 on the other side, see FIG. 3. In advantageous exemplary embodiments, the housing 21 is made of plastic.

Figure 3:
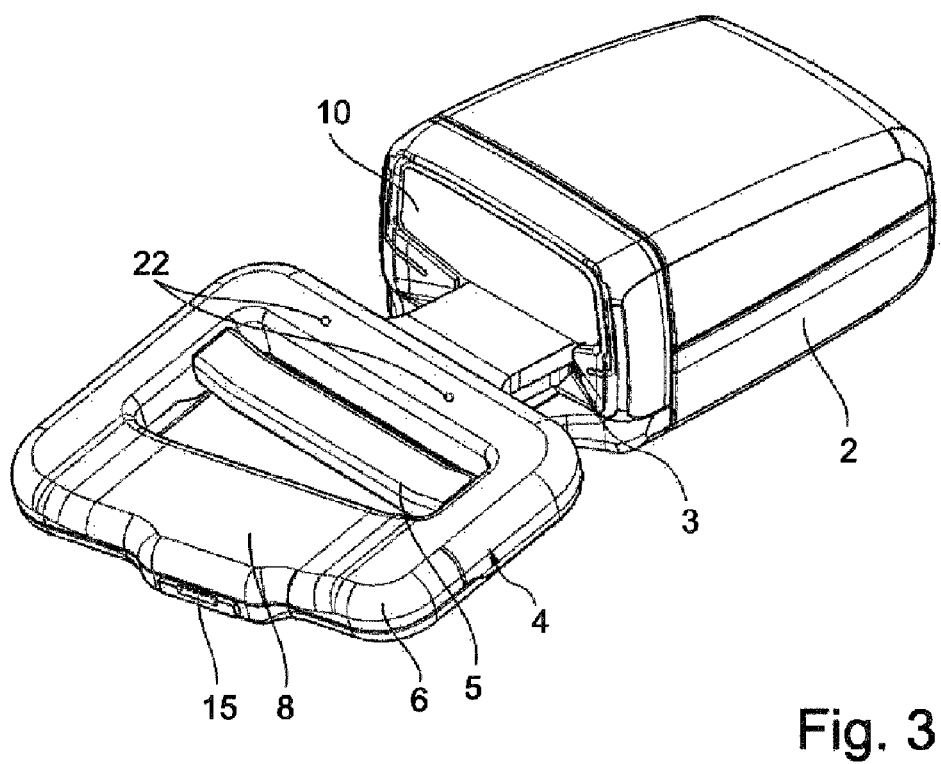
FIG. 3 shows a belt buckle with an inductor coil and inserted belt tongue with inductor coil.

FIG. 3 shows the belt buckle 2 with an inserted and locked belt tongue 4. In the inserted state, the inductor coils 9 of the belt tongue 4 and the belt buckle 2 are approximated to the extent that an inductive power transmission from the inductor coil 9 of the belt buckle 2 to the inductor coil 9 of the belt tongue 9 can take place. In this way, electrical current from the power supply of a motor vehicle can be provided on the belt tongue 4. For this purpose, the belt buckle 2 is preferably connected or connectable to the onboard power supply system of a motor vehicle, which is possible in a simple manner by means of cables and/or plug connections. In addition to or as an alternative to the transmission of electrical energy to the belt tongue 4, an inductive signal transmission of electrical signals can take place by means of the two inductor coils 9.

Furthermore, a plug connection 15 is provided on the belt tongue 4, which makes it possible to transmit electrical power to a seatbelt 7 and/or to transmit electrical signals or data between the seatbelt 7 and the belt tongue 4. In the exemplary embodiment of FIG. 3, the plug connection 15 is arranged on the hoop 8 and is connected to the inductor coil 9 of the belt tongue 4. This connection is preferably carried out via an electronic system (not shown) in the belt tongue 4. The arrangement of the plug connection 15 on the hoop 8 of the belt tongue 4 is provided in such a way that no force is applied from the seatbelt 7 to the belt tongue 4 in this region.

The belt tongue 4 can have, for example, two status indicators 22 in the form of two status LEDs. These can inform a user, for example, about the locked state of the belt tongue 4, via their lighting state, i.e., by flashing and/or different luminescent colors. Furthermore, for example, a status display 22 can indicate the state of a wireless data connection, for example from a belt microphone in the seatbelt 7 to a further system in the vehicle via Bluetooth.

Figure 4:
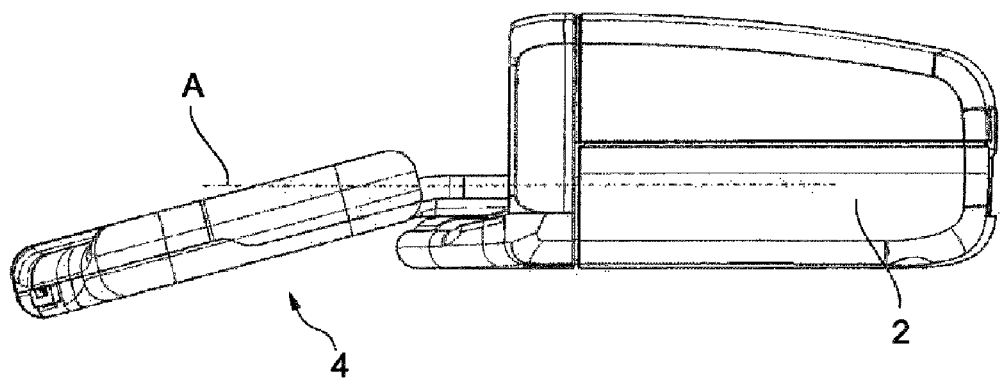
FIG. 4 shows a belt buckle with an inductor coil and inserted belt tongue in a side view.

FIG. 4 shows the belt buckle 2 with inductor coil 9 and inserted belt tongue 4 in a side view in which the insertion axis A can be clearly seen. The belt tongue 4 is inserted with parts of the belt tongue main body 5 and the locking section 11 into the insertion slot along the insertion axis A and locked therein. When the unlocking button 10 is actuated, the belt tongue 4 can be removed from the belt buckle 2 along the insertion axis A counter to the insertion direction B. The position of the belt tongue 4 in the belt buckle 2 in FIG. 4 corresponds to a position in which no further extension of the belt tongue 4 out of the belt buckle 2 is possible without actuation of the unlocking button 10. This position forms a first limit of the movement clearance of the belt tongue 4 along the insertion axis A, which can also be referred to as normal position. In the locked state, further pushing-in of the belt tongue 4 into the belt buckle 2 along the insertion axis A is also possible due to the design until an end stop is reached. This position, also called overtravel, forms the second limit of the movement clearance of the belt tongue 4 along the insertion axis A. The movement clearance relates only to the locked state; when the belt tongue 4 is released, the first limit of the movement clearance is exceeded.

In this advantageous embodiment, the inductive transmission of electrical power and/or signals in each position of the range of movement is possible. For this purpose, the inductor coils 9 of the belt tongue 4 and the belt buckle 2 are optimally positioned relative to one another in a central position, i.e. not at one of the limits of the range of movement. An optimal positioning is achieved in addition to the smallest possible distance by a concentric arrangement of the two inductor coils 9. In this case, the inductor coils 9 are not optimally arranged with respect to one another in the normal position, which admittedly reduces the efficiency in this position, but offers the advantage that a sufficient transmission of electrical power and/or signals is also possible in the transfer position.

The relative position of the coils 9 in the range of movement is shown schematically in FIG. 4, wherein the solid spiral represents the inductor coil 9 of the belt tongue 4. The dashed spiral schematically represents the inductor coil 9 of the belt buckle 2.

Figure 5:
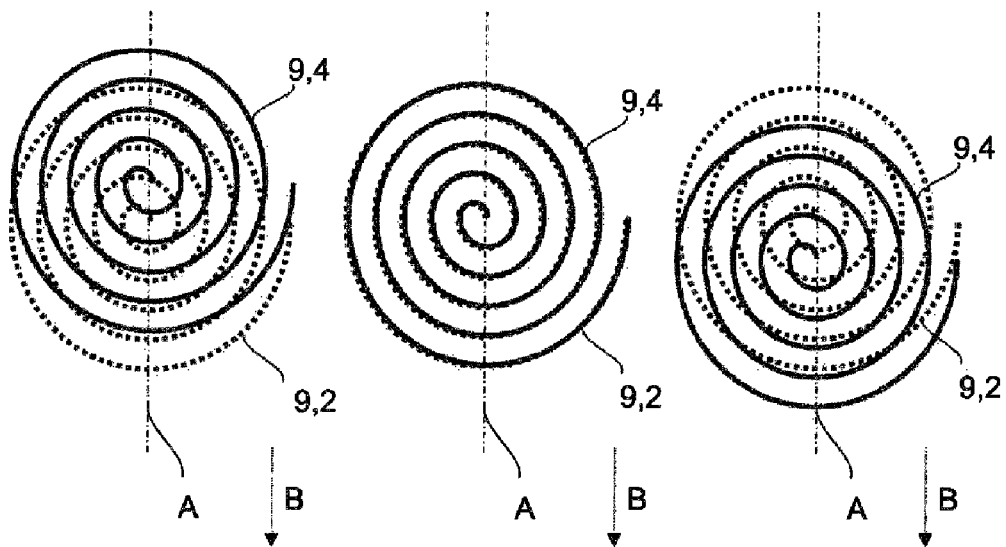
FIG. 5 shows a schematic view of inductor coils of a belt tongue and a belt buckle within a movement clearance.

In the left-hand illustration of FIG. 5, the belt tongue 4 and thus the associated inductor coil 9 are located in the normal position in which no further extension is possible without releasing the locking. The positioning of the inductor coils 9 relative to one another is therefore not optimal for an inductive transmission of electrical power and/or signals.

The central representation of FIG. 5 shows an optimal relative position of the inductor coils 9 in which the inductor coils 9 are arranged concentrically to one another. This relative position is occupied in a central region of the movement clearance. The central region therefore has a distance from the limits of the movement clearance along the insertion axis A, wherein the distance can, for example, be 25% of the movement clearance along the insertion axis A, for example; furthermore the central region can, for example, be a distance of 35% or further, for example 45%. Furthermore, it is possible for the optimum relative position at the center to be assumed at the same distances from the limits between normal and travel position.

The inductor coil 9 of a belt tongue 4 can be seen in the right view of FIG. 5 in the overtravel position in which the locked belt tongue 4 is pressed deeply into the belt buckle 2, for example by a passenger resting their hand on it. Inductive power transmission is also possible to a sufficient extent in this position.

Figure 6:
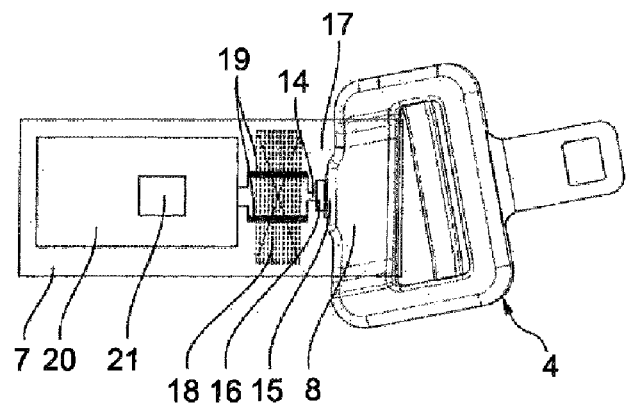
FIG. 6 shows a belt tongue with sewn loop of a seatbelt and flexible printed circuit.

FIG. 6 shows the belt tongue 4 with a seatbelt 7, which has a sewn loop 17 that encloses the hoop 8 of the belt tongue 4. Thus, no sliding of the seatbelt 7 through the hoop 8 is possible. The sewn loop 17 is closed by a sewn portion 18 which connects both ends of the sewn loop 17 to one another. A seatbelt 7 with a belt tongue 4 fixed by means of sewn loop 17 is suitable for example for a three-point belt with two retractors or belt retractors, wherein a belt retractor is provided for the pelvis strap and the other belt retractor is provided for the chest.

The plug connection 15 on the hoop 8, see also FIG. 3, is therefore largely concealed by the sewn loop 17 and is only visible via the lateral openings of the sewn loop 17. The plug connection 15 of the hoop 8 is connected or locked to a plug connection 16 of the seatbelt 7. The plug connection 16 is fastened to a cable 14 which, within the sewn loop 17, enables sufficient mobility of the connection between the seatbelt 7 or the outlet opening of the cable 14 and the plug connection 16 in order to be able to compensate for movements of the hoop 8 within the sewn loop 17. In this advantageous embodiment, the cable 14 enters the sewn loop 17 Via the inner surface.

The cable 14 can transmit electrical power and/or signals from the belt buckle 2 to a flexible circuit board 20 which is integrated in the seatbelt 7 and enables various functionalities, such as for example belt microphone, belt lighting, haptic warning devices, triggering of belt airbags or passenger classification.

The cable 14 and the flexible circuit board 20 can be positioned, for example, within a seatbelt 7 designed as a hose. The cable 14 enters the preferably tubular seatbelt 7 within the sewn loop 17. The cable 14 has at least two lines 19 for the transmission of electrical power and/or signals.

The lines 19 of the cable 14 are guided next to one another at a distance from the sewn portion 18. The lines 19 are, at least in this region, comparatively wide, i.e., for example, wider than 2 mm or, for example, wider than 5 mm. This leads to the fact that the lines 19 can be designed to be very thin, so that they are not visible in the seatbelt 7. At the same time, during the production of the sewn section 18, the lines 19 can be pierced so that the seam runs through the lines 19 itself.

Figure 7:
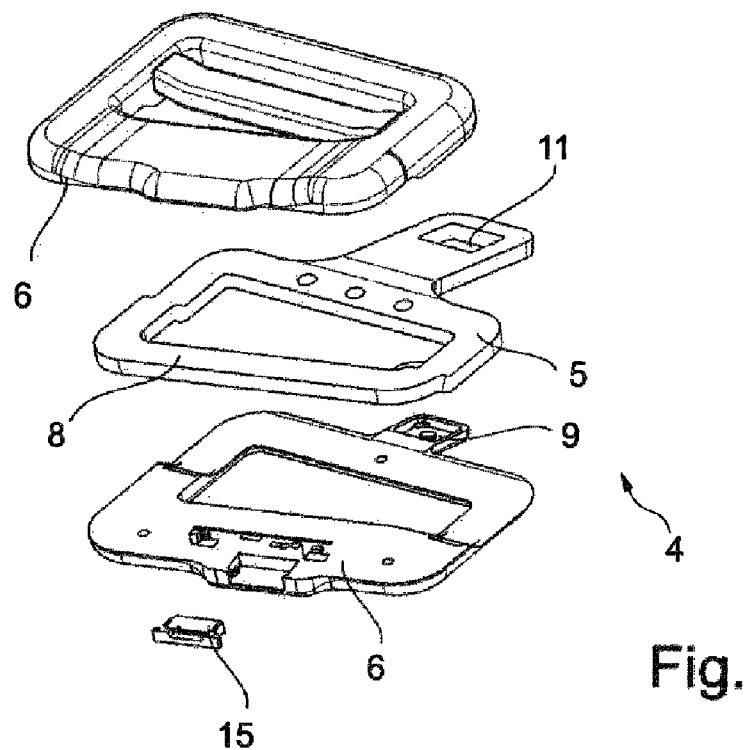
FIG. 7 shows an exploded view of a belt tongue with an inductor coil

FIG. 7 shows an exploded view of a corresponding belt tongue 4 with inductor coil 9, wherein the belt tongue main body 5 with the two-part belt tongue cover 6 can be seen. Furthermore, the position of the inductor coil 9, which is concealed outwardly by the belt tongue cover 6, can be seen. The inductor coil 9 is electrically connected to the plug connection 15.

Figure 8:
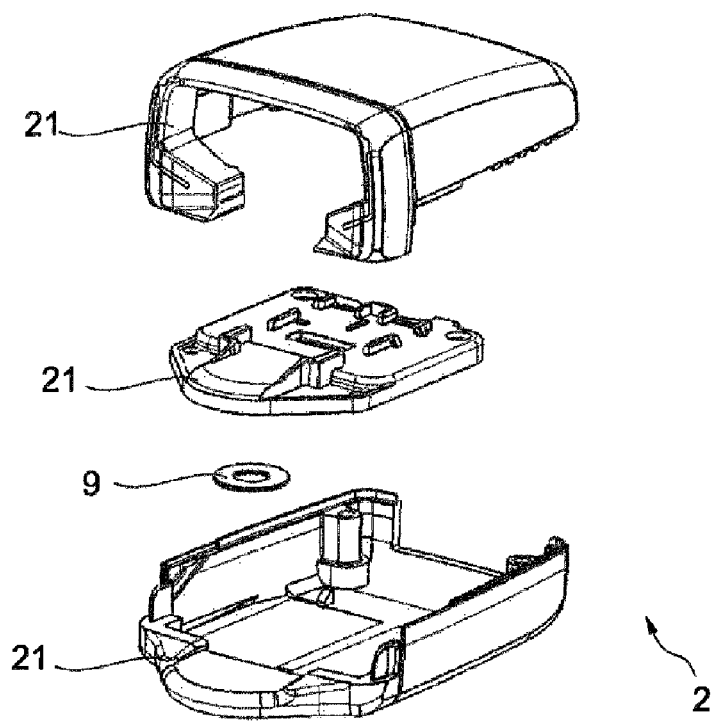
FIG. 8 shows an exploded view of a belt buckle with an inductor coil

An exploded view of the belt buckle 2 is shown in FIG. 8. The position of the inductor coil 9 of the belt buckle 2 can also be seen here, which is covered by the parts of the housing 21 of the belt buckle 2 from all sides. The arrangement of the inductor coil 9 in the region of the insertion slot 3 can be clearly seen. The unlocking button 10 and the locking mechanism of the belt buckle 2 are not shown.

Figure 9:
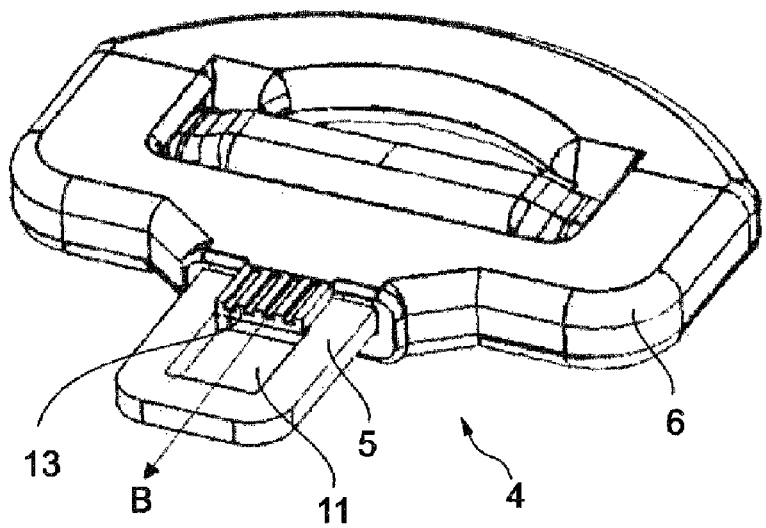
FIG. 9 shows a belt tongue with electrical contacts for a belt lock.

FIG. 9 shows an alternative embodiment of the belt tongue 4, which also enables a transmission of electrical power and/or signals to a seatbelt 7. The transmission to a seatbelt 7 can take place in the same way as for example in the exemplary embodiment of FIG. 6. In contrast to the previous exemplary embodiments, no inductive transmission of electrical power and/or signals takes place. Instead, four electrical contacts 13 are provided on the belt tongue 4, via which electrical contacts an electrical connection to a corresponding belt buckle 2, see FIG. 10, can be produced. In addition to the four contacts, for example, the belt tongue main body 5 can also be a contact, for example for earth.

The electrical contacts 13 are oriented parallel to the insertion direction B and are positioned opposite the insertion direction B in relation to a locking portion 11. The parallel alignment enables a sliding contact in the movement clearance along the insertion axis A.

Figure 10:
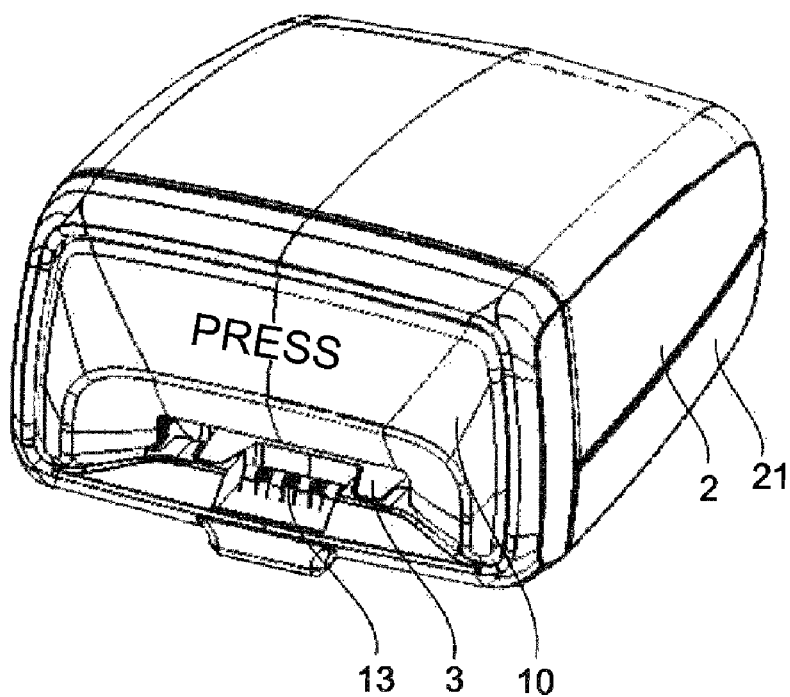
FIG. 10 shows a belt buckle with electrical contacts for a belt tongue.

FIG. 10 shows a corresponding belt buckle 2 with electrical contacts 13 below the insertion slot 3, which in an inserted belt tongue 4 can establish an electrical connection to the electrical contacts of the belt tongue 4.

The invention claimed is:

1. A seatbelt device for motor vehicles comprising:
a belt buckle having an insertion slot;
a belt tongue inserted into the insertion slot of the belt buckle along an insertion direction and locked therein, the belt tongue having a belt tongue main body and a belt tongue cover; and
a seatbelt,
wherein the seatbelt extends through a hoop of the belt tongue,
wherein each of the belt buckle and the belt tongue has an inductor coil configured to transmit electrical power and/or signals from the belt buckle to the belt tongue, and
wherein the inductor coil of the belt buckle is arranged in relation to the insertion slot on an opposite side of an unlocking button of the belt buckle such that the inductor coil of the belt buckle is entirely spaced apart from the unlocking button perpendicularly from the insertion direction.

2. The seatbelt device according to claim 1, wherein the inductor coil of the belt buckle is arranged in a region of the insertion slot for inserting the belt tongue.

3. The seatbelt device according to claim 1, wherein the inductor coil of the belt tongue is arranged above a locking portion of the tongue main body in relation to the insertion direction.

4. The seatbelt device according to claim 1, wherein the inductor coil of the belt tongue is arranged on a main surface of the belt tongue main body, the inductor coil being covered by the belt tongue cover.

5. The seatbelt device according to claim 1, wherein
the belt tongue in an inserted and locked state has a movement clearance along an insertion axis, wherein the movement clearance is limited on the one hand by a locking position of the belt tongue, in which no further extension of the belt tongue is possible without actuation of an unlocking button, and on the other hand by a pushing-in position of the belt tongue, in which no deeper insertion of the belt tongue into the insertion slot is possible, wherein
the inductor coil of the belt tongue and the inductor coil of the belt buckle are arranged concentrically to one another in a certain relative position in the movement clearance.

6. The seatbelt device according to claim 5, wherein the relative position in which the inductor coil of the belt tongue and the inductor coil of the belt buckle are arranged concentrically to one another is arranged in a central region of the movement clearance.

7. A seatbelt device for motor vehicles comprising:
a belt buckle having an insertion slot;
a belt tongue inserted into the insertion slot of the belt buckle along an insertion direction and locked therein, the belt tongue having a belt tongue main body and a belt tongue cover; and
a seatbelt,
wherein the seatbelt extends through a hoop of the belt tongue,
wherein the belt tongue and the belt buckle each have a plurality of electrical contacts which, when the belt tongue is inserted and locked, produce a plurality of electrical connections for transmitting the electrical power and/or signals between the belt buckle and the belt tongue, and
wherein the plurality of electrical contacts of the belt buckle are arranged in relation to the insertion slot on an opposite side of an unlocking button of the belt buckle such that the plurality of electrical contacts of the belt buckle is entirely spaced apart from the unlocking button perpendicularly from the insertion direction.

8. The seatbelt device according to claim 1, wherein at least two electrical connections are provided for transmitting the electrical power and/or signals from the belt tongue to the seatbelt.

9. The seatbelt device according to claim 1, wherein a plug connection is provided on the hoop of the belt tongue, wherein the plug connection is arranged on the hoop on a side facing away from the insertion direction.

10. The seatbelt device according to claim 1, wherein the hoop of the belt tongue is folded over by a sewn loop of the seatbelt, wherein a plug connection is provided on the seatbelt, said plug connection being arranged within the sewn loop of the seatbelt.

11. The seatbelt device according to claim 10, wherein the plug connection of the seatbelt is arranged on a cable which exits from the seatbelt within the sewn loop.

12. The seatbelt device according to claim 11, wherein the cable extends through a sewn portion of the sewn loop of the seatbelt.

13. The seatbelt device according to claim 12, wherein the cable has said two lines, at least in the sewn portion, said lines having a width greater than 2 mm.

14. The seatbelt device according to claim 1, wherein a flexible printed circuit is provided in or on the seatbelt to which the electrical power and/or signals is transmitted from the belt buckle via the belt tongue and via the seatbelt.

15. The seatbelt device according to claim 7, wherein the plurality of electrical contacts of the belt tongue are arranged above a locking portion of the belt tongue main body in relation to the insertion direction.

16. A seatbelt device for motor vehicles, the seatbelt device comprising:
a belt buckle having an insertion slot;
a belt tongue inserted into the insertion slot of the belt buckle and locked therein, the belt tongue having a belt tongue main body and a belt tongue cover; and
a seatbelt,
wherein the seatbelt extends through a hoop of the belt tongue,
wherein each of the belt buckle and the belt tongue is configured to transmit electrical power and/or signals from the belt buckle to the belt tongue, wherein a plug connection is provided on the hoop of the belt tongue, and wherein the plug connection is arranged on the hoop on a side facing away from an insertion direction of the belt tongue.

\* \* \* \* \*